US011078365B2

(12) United States Patent
Edelmann et al.

(10) Patent No.: US 11,078,365 B2
(45) Date of Patent: Aug. 3, 2021

(54) FORMALDEHYDE-FREE WOOD BINDER

(71) Applicant: Sestee Sp. z o.o., Cracow (PL)

(72) Inventors: Hans-Joachim Edelmann, Bad Harzburg (DE); Oswald Sander, Bad Grund (DE)

(73) Assignee: Sestec Sp. z o.o., Cracow (PL)

( * ) Notice: Subject to any disclaimer, the term of this patent is extended or adjusted under 35 U.S.C. 154(b) by 0 days.

(21) Appl. No.: 16/085,910

(22) PCT Filed: Feb. 27, 2017

(86) PCT No.: PCT/EP2017/054480
§ 371 (c)(1),
(2) Date: Sep. 17, 2018

(87) PCT Pub. No.: WO2017/157646
PCT Pub. Date: Sep. 21, 2017

(65) Prior Publication Data
US 2019/0119500 A1    Apr. 25, 2019

(30) Foreign Application Priority Data

Mar. 17, 2016 (EP) ..................................... 16000650

(51) Int. Cl.
*B27N 3/00* (2006.01)
*C08L 97/02* (2006.01)
(Continued)

(52) U.S. Cl.
CPC .............. *C08L 97/02* (2013.01); *B27N 3/002* (2013.01); *C08G 16/0225* (2013.01);
(Continued)

(58) Field of Classification Search
CPC ...... C08L 97/02; B27N 3/002; C08G 16/0225
See application file for complete search history.

(56) References Cited

U.S. PATENT DOCUMENTS 2,105,269 A * 1/1938 Robinson ................ C08L 61/06
                                              524/14
4,172,057 A   10/1979 Henbest
(Continued)

FOREIGN PATENT DOCUMENTS

DE   10 2014 105 879   10/2015
WO   2015/086035       6/2015
(Continued)

OTHER PUBLICATIONS

English-language machine translation of WO 2015/162300, conducted on Espacenet website Oct. 11, 2019.*
(Continued)

*Primary Examiner* — Nicholas E Hill
(74) *Attorney, Agent, or Firm* — Hovey Williams LLP

(57) ABSTRACT

The formaldehyde-free binder for materials containing cellulose contains a hydroxy aldehyde resin polycondensed with an ammonium salt, the resin being obtained, in especially preferred embodiments, from glycerin, in situ, with the aid of hydrogen peroxide. A protein component consisting of animal blood is added. The binder is urea-free and can be used as a one-component or two-component binder. It binds materials such as wood, paper and other natural fibres to form high-quality composite material products.

22 Claims, 3 Drawing Sheets

Figure 1:
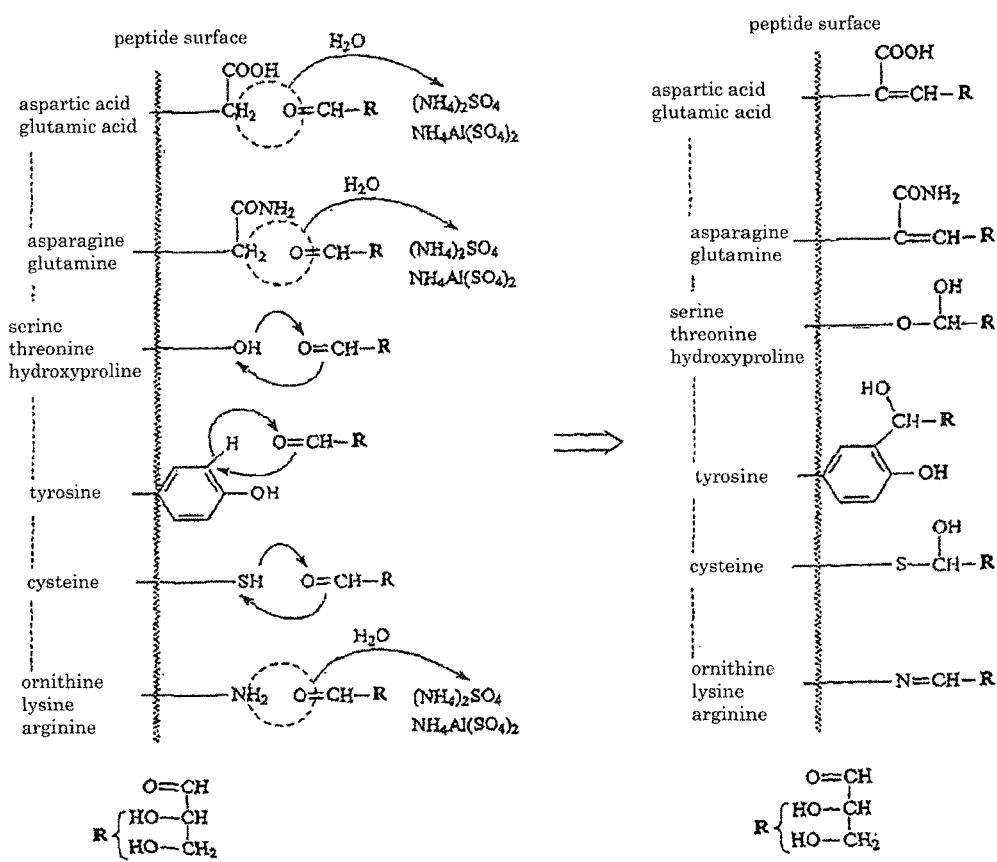

(51) Int. Cl.
*C08L 61/22* (2006.01)
*C08L 89/06* (2006.01)
*C08L 61/30* (2006.01)
*C08G 16/02* (2006.01)
*C08L 61/00* (2006.01)
*C08L 89/00* (2006.01)
*C08G 12/34* (2006.01)
*C08G 12/06* (2006.01)
*C08G 12/46* (2006.01)
*B27N 3/02* (2006.01)

(52) U.S. Cl.
CPC ............... *C08L 61/00* (2013.01); *C08L 61/22* (2013.01); *C08L 61/30* (2013.01); *C08L 89/00* (2013.01); *C08L 89/06* (2013.01); *B27N 3/02* (2013.01); *C08G 12/06* (2013.01); *C08G 12/34* (2013.01); *C08G 12/46* (2013.01); *C08L 2205/03* (2013.01); *C08L 2312/00* (2013.01)

(56) References Cited

U.S. PATENT DOCUMENTS

| | | | |
|---|---|---|---|
| 2010/0087571 A1* | 4/2010 | Jackson | B27N 3/002 524/13 |
| 2013/0059075 A1* | 3/2013 | Appley | C08G 12/00 427/222 |
| 2015/0284566 A1* | 10/2015 | Sniady | B27N 3/00 106/164.3 |
| 2018/0155583 A1* | 6/2018 | Kakuda | C09D 105/00 |
| 2020/0270495 A1* | 8/2020 | Edelmann | C09J 197/005 |

FOREIGN PATENT DOCUMENTS

| | | |
|---|---|---|
| WO | 2015/086074 | 6/2015 |
| WO | WO-2015162300 A1 * | 10/2015 |
| WO | WO-2017022237 A1 * | 2/2017 ........... C09D 105/00 |

OTHER PUBLICATIONS

Edgar J. Witzemann, "The Isolation of Crystalline dl-Glyceric Aldehyde from a Syrup Obtained by the Oxidation of Glycerol," 36 Journal of the American Chemical Society 2223 (1914).*

L. Calve & J. M. J. Frechet, "Wood Adhesives Based on Lignin Wastes: Influence of the Carbohydrates in the Polymerization of Spent Sulfite Liquor," 28 Journal of Applied Polymer Science 1969 (1983).*

International Search Report dated Jun. 2, 2017 in corresponding PCT/EP2017/054480, 2 pages.

* cited by examiner

FORMALDEHYDE-FREE WOOD BINDER

RELATED APPLICATIONS

This application claims priority to PCT International Patent Application No. PCT/EP2017/054480, filed Feb. 27, 2017, which claims the priority benefit of European Patent Application No. 16000650.8 filed Mar. 17, 2016 both of which are hereby incorporated by reference in their entireties.

The invention relates to a formaldehyde-free binder for cellulose-containing materials, in particular wood and paper, as well as a corresponding composite material product, such as in form of a board.

The term "binder" is often used for composite materials and describes a compound or agent which sticks together or "binds" different substrates or materials, respectively, within the composite material. The binder for cellulose-containing materials may also be synonymously described as adhesive; it binds lumpy materials or more expanded substrates adhesively and/or cohesively, including reactively.

"Cellulose-containing materials" contain cellulose, hemicellulose, holocellulose or lignocellulose and hence also lignin. Therefore, cellulose-containing materials are inter alia wood, pulp, straw, bagasse, kenaf, bamboo, sisal, hemp, coconut fiber and paper, just to mention the most important ones. Wood and paper composite materials are still of highest importance in Europe.

As starting materials for composite material products containing the aforementioned materials and suitable binders are to be particularly mentioned solid wood, wood chips, saw dust, mechanical wood pulp, wood flour, wood pulp etc., also in form of recycled materials, such as waste wood or waste paper.

For wood based composite materials, amine resins (also called amino resins or amino plastics), amide resins and resins of aromatic hydroxy compounds, such as phenolic resins, are industrially used on a large scale. These compounds are provided in the binder as relatively low molecularly cross-linked, curable resins which are inter alia cured by being subjected to heat during processing to composite material shaped bodies. After curing a duroplastic cross-linkage is present. These widely-used aminoplastic binder resins are obtained by polycondensation of carbonyl compounds and NH-group-containing compounds. The carbonyl compounds may be aldehydes or ketones, more often aldehydes, and the nitrogen-containing compounds cross-linked therewith may be very manifold, wherein the most important resin groups are urea resins (UF), melamine resins (MF) and dicyandiamide resins (DD). Water-based resins—low molecularly condensed, not yet cured resins of the aforementioned type in aqueous solution—are also referred to as glue resins. Also this invention primarily relates to binder adhesives, i.e. water-based binders and aqueous binder solutions, respectively. In general, these may also be used as spray-dried powders in molding compositions.

The usual wood binders based on amino plastics exhibit several disadvantages. For setting, a curing is necessary which occurs in a certain time frame after initiation. This time frame is difficult to control. Therefore, production shutdowns are an issue. Emissions are another important disadvantage of the final composite material products. Until today, low cost and well setting formaldehyde is used on a large scale, above all in UF and MF resins, which have a large market share, although the problems of emission associated therewith are known. In order to solve this problem, it is normally attempted to reduce the emission of formaldehyde, i.e. to embed it so firmly that it cannot escape. So far, achievements in that direction have been limited.

Since Apr. 1, 2015, EU regulation 605/2014 is in force, in which the emission limits of the particularly carcinogenic rated formaldehyde in production plants have been lowered from 20 $mg/m^3$ to 1 $mg/m^3$. Implementation is to be expected until August 2017 (REACH regulation). Therefore, binders without emissions of formaldehyde are of great interest.

Attempts have been made for a long time to substitute formaldehyde with other aldehydes or ketones. The materials must not be too expensive and the required material properties need to be achievable with the replacement material. Fast setting and good mechanical stability are important.

WO 2015/086074 A1 discloses formaldehyde-free resins based on hydroxyaldehydes, in which a hydroxymonoaldehyde is reacted with an amine, an amide or an aromatic hydroxy compound. Possible amines or amides are particularly urea, melamine, benzoguanamine, dicyandiamide, acetylene diurea, aminotriazine, diaminoalkanes, diamidoalkanes and polyacrylamide. Glycolaldehyde or glyceraldehyde or a mixture of these aldehydes is preferably used as hydroxymonoaldehydes. The hydroxymonoaldehydes are separately prepared in a prior step, preferably by means of a so-called Umpolung reaction from formaldehyde. Therefore, the process is relatively complex, expensive and poses the risk that formaldehyde residuals enter the mixture if the process is not run in a clearly separated two step manner, which in practice once more leads to an increase in cost.

Glycolaldehyde and glyceraldehyde having the formula $(CH_2O)_n$ may be considered as carbohydrate aldehydes. The use of such aldehydes in amino resins is also already addressed in U.S. Pat. No. 4,172,057 A, wherein a hydroxyaldehyde or-ketone is introduced into an amino resin, particularly a urea formaldehyde resin or a melamine formaldehyde resin. In the Example, glucose is added to the conventional amino resins in order to modify the resin. The modified resin is processed into fibers which are intended to be used as an adhesive for paper production.

Finally, a process for the production of a composite material comprising at least a cellulose-containing substrate and a multi-component binder is known from DE 10 2014 105 879 A1. A first component of the binder comprises animal blood and a second component of the binder comprises at least one additive from a list comprising inter alia urea, alum, glycerol, formaldehyde, isocyanate, hexamine, aluminium salts, acids and bases as well as peroxide.

These substances referred to as additives may be used alone or in a mixture and may be applied in combination with the first component. This offers a plurality of options. The given examples are very different and lead to very heterogeneous results. The products are not free of formaldehyde, i.e. not free of emissions.

In contrast to this, it is the problem underlying the invention to provide a binder being harmless from an ecological viewpoint, being strictly free of formaldehyde and, therefore, free of emissions which can be used in a great variety of composite materials and particularly wood and paper composite materials.

The binder shall secure compliance with emission standards during the production of end products, such as composite materials. The process of setting shall take place as controlled and quickly as possible in order to provide good and reproducible results in continuous production processes.

The new binder should be obtainable from inexpensive raw materials and be storable and transportable preferably as one-component system.

These problems are solved by a binder according to claim 1 and the composite material product obtainable thereby according to claim 12.

According to the invention, a hydroxyaldehyde, which includes mixtures of several hydroxyaldehydes, is polycondensed and cross-linked with an ammonium salt. The binding possibilities in the complex system between ammonium ($NH_4^+$), aldehyde and cellulose structures are manifold. If present, a protein component additionally interferes with the system. The binding possibilities are illustrated in more detail by means of figures hereinafter.

It has surprisingly been found that ammonium salts condense with hydroxyaldehydes to excellent binder resins which stick together or bind cellulose-containing materials well and particularly lead in composite materials with cellulose-containing materials to good mechanical strengths and overall very satisfying product qualities. It has not been recognized before to which extent ammonium salts could be used in binder resins, especially as a replacement of urea, and which advantages are provided therewith.

The general capability of carbonyl compounds to react with ammonia and ammonium cations as such has been known for a long time, e.g. from the production of urotropin or from the titration with formol. However, this principle has not yet been used in the way described herein.

The cross-linking capabilities of glyceraldehyde and, not separately shown, also of dihydroxyacetone which may be present in mixtures as a coupling product, as subsequently described in more detail, become clear from FIGS. 1 to 3. Other hydroxyaldehydes and associated ketones would react in a corresponding manner. FIG. 1 schematically shows the binding of the glycol to a peptide surface. The binding to cellulose-containing substrates takes place in a corresponding manner via OH-groups of cellulose. The scheme of FIG. 2 addresses further condensation options. FIG. 3 schematically acknowledges in particular the influence of the ammonium salt which forms a central part of the invention.

The binder according to the invention can replace the very widely used UF and MF resins by emission-free environmentally friendly products. Certain suitable ammonium salts are commercially obtainable and available in large amounts at low costs.

In many embodiments, the relatively high content of ammonium salt is also responsible for a high content of solids in the binder. The low water content associated therewith, which preferably is below 50 wt.-%, is essential or advantageous for some binder applications.

In preferred embodiments, the ammonium salt or the several ammonium salts in the mixture are used in a stoichiometric ratio relative to hydroxyaldehyde. Besides the ammonium salts optionally in minor amounts present amines or amides—also amines and amides present within a protein component—are considered in the stoichiometric assignment, if necessary.

Carbohydrate aldehydes of the formula $(CH_2O)_n$, which include glycol aldehyde, glyceraldehyde, trioses and higher aldoses, are preferred hydroxyaldehydes. Glyceraldehyde is particularly preferred.

Within the scope of the invention, it has surprisingly been found that these hydroxyaldehydes and particularly glyceraldehyde can be very advantageously produced within the binder, that is in situ, with a mild oxidizing agent from at least difunctional hydroxy compounds (polyols). Hydrogen peroxide is a preferred oxidizing agent. In a particularly preferred embodiment, at least one at least difunctional hydroxy compound, preferably glycerol, and the oxidizing agent, preferably hydrogen peroxide, are present in the binder in order to in situ form the hydroxyaldehyde, preferably glyceraldehyde, which subsequently reacts to the hydroxyaldehyde resin with the ammonium salt and optionally further substances present in the binder mixture. This sets in the course of the overall reaction under the action of heat and pressure.

It is particularly surprising that the binder with all components including diol or polyol and peroxide or other oxidizing agent is storable for a long time, such as more than a year.

The formation of glyceraldehyde and dihydroxyacetone from glycerol is effected with a suitable mild oxidizing agent and preferably with hydrogen peroxide. The by-product dihydroxyacetone polycondenses with NH-reactive components (ammonium salts, melamine, urea) in a corresponding manner as the aldehyde (see FIG. 1). Both these compounds may rearrange into each other via an endiol (Lobry-de-Bruyn-van-Ekenstein-rearrangement). Thus, it is not necessary to produce a pure aldehyde in advance. The combination of ammonium salt, polyol, that is preferably glycerol, and oxidizing agent, preferably hydrogen peroxide, already leads to a glue resin. The ideal proportions can easily be found. For this purpose, the chemical structure of the substrate has also some influence.

In preferred embodiments, the binder is free of urea. By using urea, but without formaldehyde, only a weak adhesive force is attained.

In a further embodiment of the invention, it is intended that a protein component is included in addition to components described so far. Proteins also include polypeptides. This protein component additionally reinforces the cross-linked molecular structure which is formed in the binder and between binder and cellulose-containing material and substrate, respectively. At the same time, it provides structure to the adhesive and may serve as filler. If the aldehyde (and/or ketone) is contacted with the protein component its carbonyl and hydroxyl groups react with the functional groups of the protein. Condensation and esterification reactions ensue.

Figure 2:
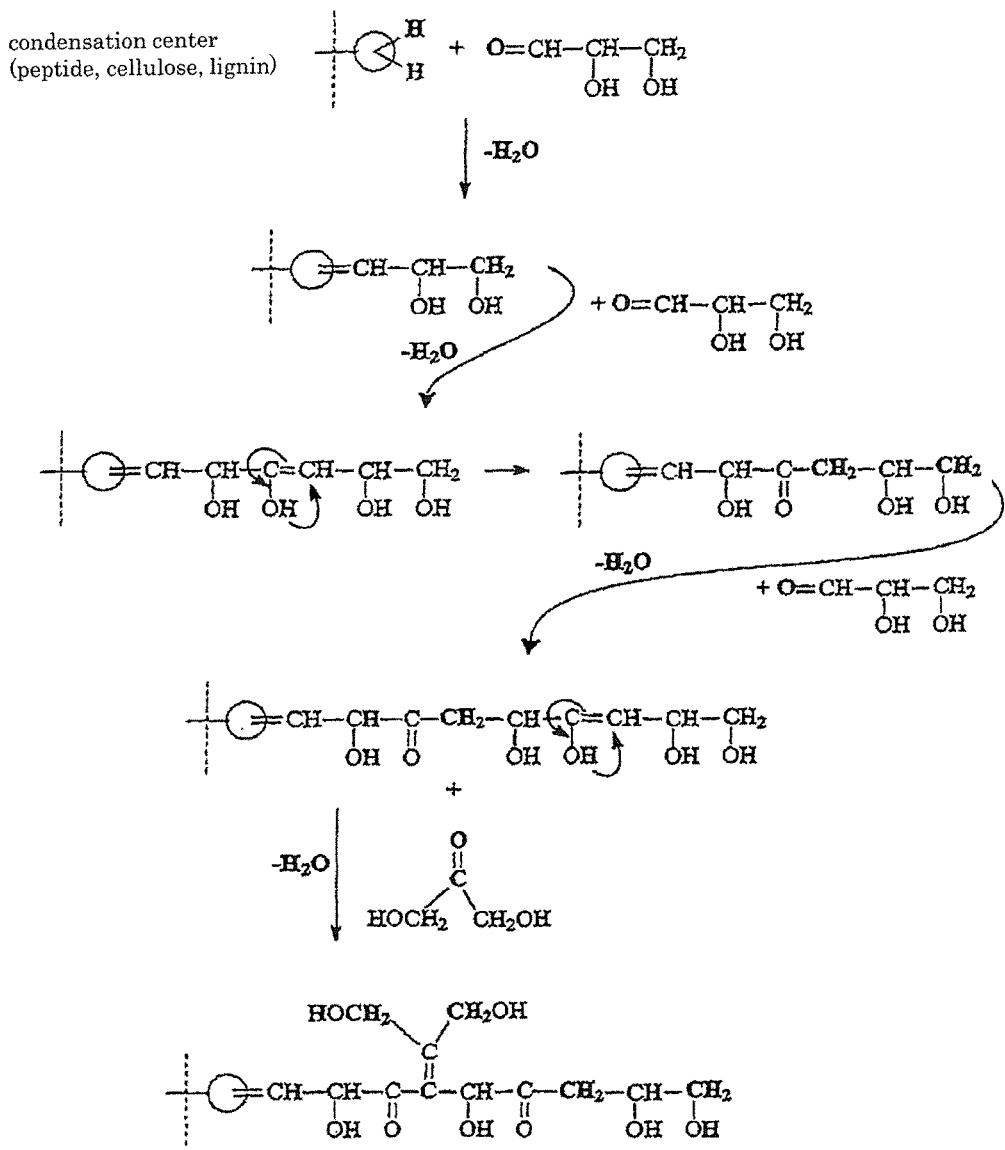
Figure 3:
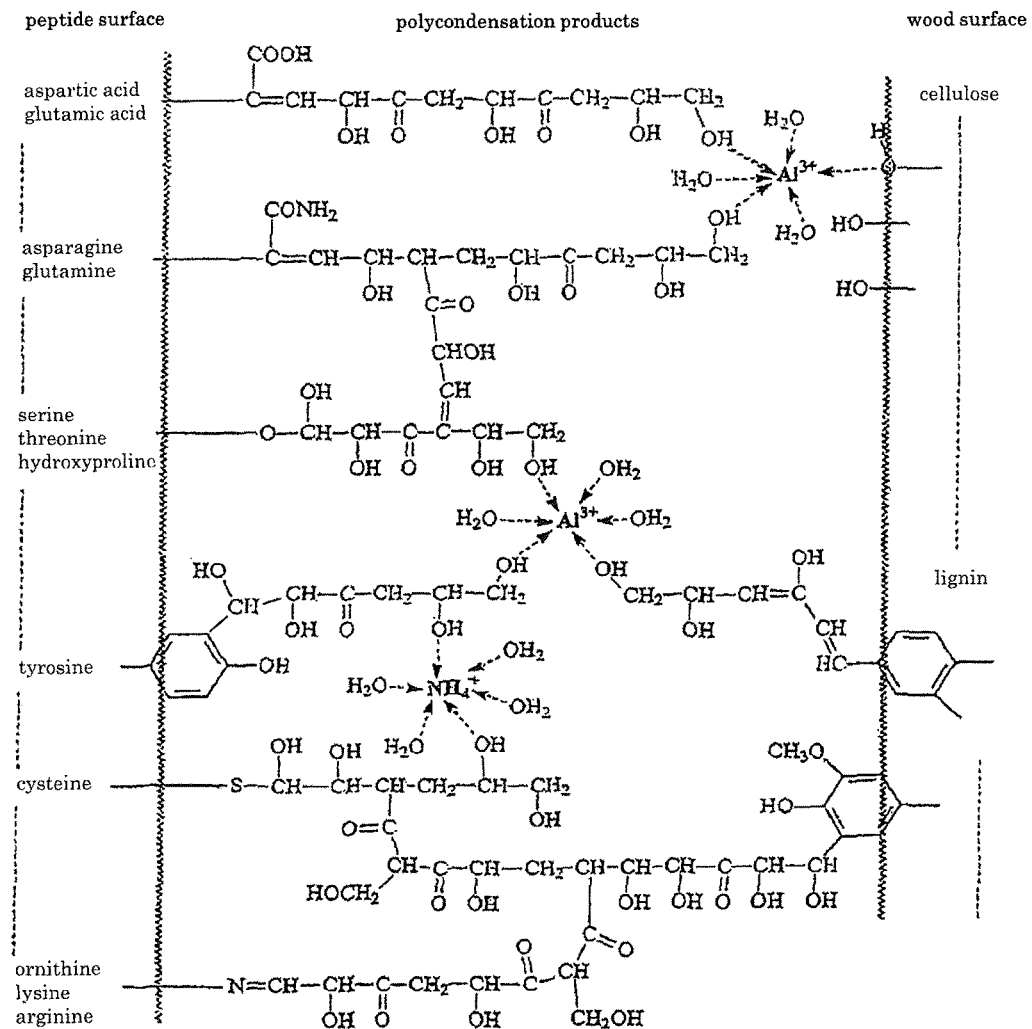

The chemical relations are shown in summary and in strongly simplified manner in the schemes according to FIGS. 1 to 3. The nature of the reaction mechanism is—also because of fluctuations of composition—much more complex and can only be depicted in roughly simplified manner. It is solely intended to facilitate the basic understanding of the invention.

The presence of the protein provides significant advantages. As a macromolecule, the protein provides a surface onto which many glycerol units can bind which in turn cross-link by means of the NH component, the ammonium. Additionally, amine and amide functionalities of the protein may react with the carbonyl groups of the aldehyde/ketone. Hydroxy groups of the aldehyde or ketone may esterify with acidic functionalities of the protein and so on. Thus, the stiffness of the cross-linked molecule structures in the binder is increased or the degree of cross-linking is increased in total.

In the binder, the protein or the proteins of the protein components are preferably present in the denatured form. This is alternatively effected by different components and the pH-value. The protein is particularly effectively denatured by hydrogen peroxide, but also by surfactant additives, if present.

The protein component improves the cross-linking of the cellulose-containing material which shall be sticked together.

In general, any inexpensively available, predominantly or sufficiently protein containing compound is suitable as protein component. The protein component is preferably based on animal blood, i.e. it is obtained from animal blood, wherein other additives may be present, and preferably comprises hemoglobin from animal blood or protein concentrate from animal blood. Powder of animal blood, such as powder of animal whole blood, i.e. dried animal blood and particularly powder of animal blood from category 3 animal blood, plasma powder or hemoglobin powder, is particularly preferred.

Hemoglobin promotes the oxidation process of the polyol with the oxidizing agent by means of the presence of iron(II). Starting from the surface of the peptide, a binding network with the NH-component is formed via the aldehyde and/or ketone.

According to the invention, ammonium compounds are used as NH-reactive compounds which add to carbonyl groups as follows:

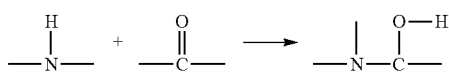

These first primary products condense, also in the network with the other partners, to the binder resin.

According to the invention, preferred ammonium salts are salts selected from the group of ammonium sulfate, ammonium alums, in particular ammonium aluminum double salt cubically crystallizing in form of the dodecahydrate like all alums, ammonium lignosulphonate and ammonium hydrogen phosphate. All these salts are commercially obtainable, available and not too expensive. Either a salt selected from this group is used for the binder or a mixture of salts of said group is used.

In a particularly preferred embodiment, the content of the ammonium salt is at least 50 wt.-%, based on all nitrogen-containing components being capable of cross-linking with hydroxyaldehydes—i.e. the NH-reactive components as described above—but without consideration of the optionally present protein component. In case of considering the protein component to be within the amount of remaining NH-reactive compounds, except ammonium, the content of ammonium salt is at least 25 wt.-%.

The ammonium salt used according to the invention may be supplemented or partly replaced, up to a maximum of 50 wt.-%, by an additional amine or amide compound. Supplementation by melamine is preferred. Supplementation of the ammonium salt by urea is, however, not preferred; rather the binder is preferably free of urea.

The weight portion of the sum of all nitrogen-containing components which are capable of binding to (addition) and cross-linking with hydroxyaldehydes, including the ammonium salt, excluding proteins, is at least 15 wt.-% of the binder.

According to a particularly preferred special embodiment, the binder consists of the components:
water, in a maximum amount of 48 wt.-%,
at least one ammonium salt,
glycerol,
hydrogen peroxide,
a protein component,
optionally an additional amine or amide, and
optionally additives and auxiliaries (additives).

In preferred embodiments, the amount of glycerol is between 5 and 40 wt.-% based on the undiluted binder as is shown in the following by means of examples.

In the examples, hydrogen peroxide is used as a 35% solution. The amount of hydrogen peroxide is in absolute values preferably between 1 and 10 wt.-% of the undiluted binder (all percentages are weight percentages, unless otherwise specified).

The protein component is preferably present in an amount of up to 20 wt.-%, particularly preferred up to 15 wt.-%. Between 4 and 10 wt.-% are used in the examples. Of course, lower amounts, such as less than 1% or 1 to 4%, may be useful in certain applications.

Additives, such as agents for improved wetting of the substrate (wetting agents), defoamers, thickeners, smoothing agents, flame retardants etc. may be added to the binder in suitable amounts which usually do not exceed 5 wt.-%. The addition of additives may be left to the person skilled in the art, suitable agents are commercially available.

Possible specific additives are surfactants, polyasparaginate as a surfactant additive, mixtures of defoamers, paraffins, thickeners, such as gelatin or 2-hydroxyethyl methyl ether, colorants.

In its ready-to-apply form, i.e. readily mixed with all its components, the binder is storable and transportable. The storability persists for months. Therefore, the binder—a binder glue or "glue resin"—is basically a one-component glue or adhesive. The person skilled in the art is at liberty to split the components of the binder into two components and to obtain a two-component glue or adhesive. An exemplification for this is given in Example 6.

The binder is preferably used in its undiluted glue basic form. The examples illustrate this in a non-limiting manner. For certain purposes—such as a precoat—the binder may also be diluted. It may also be present in dried form.

The binder may be used with all current processing machines, automated production plants but also hand presses. It binds with cellulose-containing components under heat and optionally pressure applied during processing. The compressing is preferably carried out at temperatures of more than 100° C. to 250° C. and at pressure ranges, usual for the particular processing methods, of preferably up to about 180 bar.

The processing time and the setting characteristics are well controllable via heat supply and pressure. For example, the pressing time of boards depends on the kind of the cellulose-containing substrate, the pressing temperature, the pressing pressure and also the thickness (height) of the composite boards to be formed. All these correlations are known to the person skilled in the art and, therefore, it is unnecessary to explain them in more detail.

A particular advantage of the invention is the reduction of pressing times for continuous presses. Pressing times below 10 seconds per 1 mm plate thickness are feasible.

Furthermore, the binder according to the invention may be applied as wood glue in the field of craftsmanship, as stated above as a one-component but also two-component glue.

The invention is also directed to composite material products as such which can be obtained by binding a cellulose-containing starting material with the new binder and shaping to a product. This includes all such product forms, which are obtainable with conventional glue resins, and inter alia products for the furniture industry, such as furniture boards, building material boards and heat insulation boards, dust-bound recycling products and recycling paper boards.

The composite material products according to the invention are generally available by binding a cellulose-containing starting material with the binder according to the invention and shaping to a product. In general, this yields a shaped body. All processes known in the prior art and commonly used can be employed also with the binder according to the invention. Existing processing plants may be used without taking any particular measures. In general, the shaping is carried out under action of heat and pressure as has already been common. In the course of this, for example the boards as already mentioned above or also other bodies, such as bricks etc., are obtained.

The cellulose-containing starting material for the composite material product is preferably wood and/or paper. The composite material product has in particular the shape of plates, wood boards, compressed boards made from splinter cakes, flakes and the like, in particular chipboards, laminates, medium-density fiberboards (MDF), oriented strand boards (OSB) and plywood, but also straw boards (see example) or other natural fiberboards, such as in the construction field as insulating material (hemp fiberboards etc.).

The invention will be described hereinafter in further detail based on examples having merely illustrative character and which are supposed to improve the understanding of the invention.

EXAMPLES

Nine binder glues are prepared. The compositions are shown in Table 1.

this may take place at elevated temperatures. In Table 1 under 1), the amounts of ammonium sulfate and/or ammonium alum in the binder glue are given which are obtained when the amount of the aqueous solution from 1) stated below is used for the composition.

In Example 6, which does neither comprise ammonium sulfate nor ammonium alum, the ammonium lignosulphonate is initially dissolved in water and then the further components are added.

The binder glue examples stated in Table 1 may be used in manifold ways. They bind wood, paper and other cellulose-containing natural fibers as well as synthetic pulp products. Some possibilities of use are stated in the subsequent application examples.

APPLICATION EXAMPLES

Application Example 1

In order to produce a chipboard, spruce wood chips having a residual moisture of 2% are mixed with a formaldehyde-free binder according to the invention.

The weight portion of the chips is 92% (wt.-%).

The binder mixture is a one-component mixture. The solids content of all examples is more than 50%, i.e. the water content of the binder glue is less than 50%. All inorganic and organic components of the glue including glycerol, excluding hydrogen peroxide and water, are taken into consideration for the solids content. The mixing is carried out in a spraying process in order to attain a uniform

TABLE 1

| Example | 1 | 2 | 3 | 4 | 5 | 6 | 7 | 8 | 9 |
|---|---|---|---|---|---|---|---|---|---|
| 1) 60% aqueous salt solution for . . . wt.-% of the binder glue | | | | | | | | | |
| Ammonium sulfate | 41.4 | — | 9.3 | 28.8 | 15.0 | 9.6 | 25.8 | 32.4 | — |
| Ammonium alum | — | 41.4 | 9.3 | — | — | 9.6 | — | — | — |
| 2) binder glue with following components: | | | | | | | | | |
| Solution from 1) (wt.-%) | 69 | 69 | 31 | 48 | 25 | 32 | 43 | 54 | 25 H$_2$O |
| Further N-components: | | | | | | | | | |
| Ammonium lignosulphonate | | | | 14 | 20 | | 25 | 10 | 40 |
| Ammonium hydrogen phosphate | | | | | 20 | | | | |
| Melamine | | | | | | | | 20 | |
| Glycerol (85%) | 15 | 15 | 38 | 12 | 10 | 40 | 10 | 8 | 15 |
| Hydrogen peroxide (35%) | 12 | 12 | 20 | 14 | 10 | 20 | 12 | 6 | 10 |
| Protein component (solid) | 4 | 4 | 8 | 10 | 10 | 8 | 10 | 4 | 10 |
| Additives: | | | | | | | | | |
| Surfactant, Schwego foam 6305 ® (with polyasparaginate) | | | 2 | 1 | | 1 | | | |
| Paraffin solution (ethanolic) Hydro Wax company Sasol | | | 1 | 1 | 2 | 1 | | 2 | |
| Gelatin | | | | | 3 | | | | |

(all values are in wt.-%)

Firstly, a 60 (wt.-)% aqueous ammonium salt solution is prepared if the composition comprises ammonium sulfate or ammonium aluminium sulfate dodecahydrate (or another ammonium alum). At higher amounts of ammonium salt, wetting. The binder content is, based on the solids content, 8% of the specific weight of the board.

The chips wetted with binder are uniformly spread onto a press plate so that a splinter cake is formed. The splinter cake is compressed in a plate press at a temperature of 180° C. for a period of 180 seconds so that a chipboard with a thickness of 12 mm is formed. The compressing pressure is set to 150 bar. A chipboard produced in that way is free of emissions.

The technical values of DIN ISO EN 312:210 type P2 were met.

Variation

Up to a maximum of 10 wt.-% of a 1 molar solution of potassium hydroxide (KOH), sodium hydroxide (NaOH) or calcium hydroxide ($Ca(OH)_2$) may be added to the binder.

Application Example 2

In order to produce a 12 mm thick OSB (oriented strand board), "flakes" with a wood moisture of 2-4% are required which are wetted with a one-component binder from the example part (see Tab. 1) in a tumbling process.

Based on the specific weight of the flakes and the solids content of the binder, 10% of binder is processed. The flakes wetted with the liquid are spread to a cake and are put into a plate press for compressing. Afterwards, the flake cake is compressed to an OSB plate at a temperature of 180° C. and at a pressure of 165 bar for a period of 180 seconds. The technical values of DIN ISO EN 312:210 type P2 were met.

Application Example 3

In order to produce a thin chipboard, e.g. according to the Mende-process on a calender, with a specific weight of 780 kg/$m^3$, the chips are wetted with 143 kg of binder formulation from the example part in a Loedige drum mixer. In order to meet the technical values of the EN standard, the binder content, based on the solids content, needs to reach 11%.

The 3.0 mm plate is compressed for a period of time of 30 seconds at a pressure of 140 bar and a temperature of 175° C. The technical values of DIN ISO EN 312:210 type P2 were met.

Application Example 4

A splinter cake is formed to produce a chipboard. The weight portion of wet chips is 92% with a residual moisture of 2%. A binder glue with a water content of <40% is selected. The binder is applied by a spraying process. The binder content, based on the solids content, is 8% of the specific weight of the board. The splinter cake is compressed in a single opening press at a temperature of 200° C. and a pressure of 155 bar and a compressing time of 12 seconds per mm board thickness. The technical values of DIN ISO EN 312:210 type P2 were met.

Application Example 5

In order to produce an MDF board, the wood fibers (1% wood moisture) dried over a refiner are wetted with a one-component formaldehyde-free binder according to the invention by means of drum gluing in a spraying process.

The weight portion of wood fibers is 90%; the binder content is 10% based on the solids content.

The wetted wood fibers are compressed at 185° C. and a pressure of 140 bar. The compressing time in a continuous press is 8 seconds per 1 mm board thickness. (A 6 mm board is produced in 48 seconds)

Application Example 6

The binder glue of Example 1 is produced in a two-component way.

Glue component 1: Mixture of aqueous ammonium alum solution and hydrogen peroxide;

Glue component 2: Mixture of 85% glycerol and protein concentrate of company Saval®.

mm thick birch veneers are provided to produce plywood boards (laminated wood). Glue component 1 which is very highly fluid is sprayed on one side of a birch veneer. Onto another surface of a second birch veneer, glue component 2 is rolled on with an applied quantity of 40 g/$m^2$. Subsequently, both surfaces of the birch veneers are put onto each other cross-wise and are compressed with each other at a compressing temperature of 170° C. and a pressure of 65 bar for a period of time of about 120 seconds.

Application Example 7

In order to produce a veneered area, a one-component binder according to the invention is applied with 80 g/$m^2$ onto a carrier plate, a chipboard in this case, by means of a one-sided glue application roller.

The veneer, in this case an oak veneer with a thickness of 0.6 mm, is put with its whole surface onto the glued carrier plate and is compressed in a veneer press at 70 N/$mm^2$ pressing pressure for 90 seconds.

Variation

Prior to application, the binder is diluted with up to 10 wt.-% of wheat flour or starch (preferably corn or soy starch) in order to increase the solids content and to prevent the so-called "glue penetration".

Application Example 8

A chip cake is formed to produce a 22 mm chipboard. The weight portion of wet chips is 90% with a residual moisture of 2-4%. The solids content of the binder is about 63%.

The binder content, based on the solids content, is 10% of the specific weight of the board (680 kg/$m^3$ of the final board, 68 kg solids content of the binder, 108 kg liquid binder).

The binder is applied in a spraying process.

The chip cake is compressed in a single opening press at a temperature of 210° C. and a pressure of 150 bar and a pressing time of 220 seconds.

Application Example 9

Straw Board

A one-component binder according to Example 9 is used.

The length of the straw fibers should be not more than 20 mm.

The liquid is applied by means of a Loedige ploughshare mixer.

The weight portion of straw fibers is 90%;

the binder, based on the solids content, is 10%.

The wetted straw fibers are compressed at 165° C. and a pressure of 160 bar. The pressing time in a single opening press is 15 seconds per 1 mm board thickness.

A lightweight construction board of 30 mm thickness with a specific weight of 280 kg/$m^3$ was produced.

Instead of straw, other cellulose-containing fibers (preferably from younger plants) or recycling papers can be used as well.

Comment:

Straw boards cannot be adhered with customary urea-formaldehyde-binders because the outer skin of the straw comprises paraffin and exhibits a high separation effect relative to this binder. Therefore, straw boards are produced by means of isocyanates (PDMI).

The formaldehyde-free binder according to the invention, in particular according Example 9, dissolves the paraffin structure of the straw and enables the cross-linking to give a board.

Formaldehyde Test:

A formaldehyde test was carried out in the Institute for Wood Technology Posen.

Test report No.: 371/2016/S.F. of 25-02-2016.

The six three-layered chipboards had dimensions of 290 mm×290 mm×6 mm and were produced with a binder of Example No. 4.

Three-layered chipboards (EO P1 CE) were tested for 10 days according to EN 717-1:2006 (chamber method).

The 9 measurements resulted in the following values: 0.022/0.017/0.013/0.008/0.007/0.008/0.008/0.008/0.008 ppm formaldehyde emissions.

According to the standard (EN 120/CARB standard), the formaldehyde emissions are not allowed to exceed 0.1 ppm (ml/m$^3$) under these conditions.

The measured values were far below and are derived from the organic matter of the wood.

This demonstrates that during setting no cleavage reactions with release of formaldehyde or other detrimental emissions can take place.

The obtained new board is completely free of formaldehyde emissions according to standard EN 120/CARB standard.

The invention claimed is:

1. A binder for cellulose-containing materials, which comprises a hydroxyaldehyde resin which is condensed with an ammonium salt, wherein said hydroxyaldehyde resin is formed in situ from an at least difunctional hydroxy compound and an oxidizing agent comprising hydrogen peroxide in an amount between 1 and 10 weight percent, based on the total weight of said binder, wherein said binder further comprises at least a portion of said at least difunctional hydroxy compound and at least a portion of said oxidizing agent, wherein said ammonium salt is present in an amount of at least 15 weight percent, based on the total weight of said binder.

2. The binder according to claim 1, wherein the hydroxyaldehyde for the binder resin is carbohydrate aldehyde.

3. The binder according to claim 2, wherein the hydroxyaldehyde for the binder resin is glyceraldehyde.

4. The binder according to claim 1, which is free of urea.

5. The binder according to claim 1, which comprises a protein component.

6. The binder according to claim 5, wherein the protein component is based on animal blood.

7. The binder according to claim 5, wherein the protein component comprises hemoglobin from animal blood or protein concentrate from animal blood.

8. The binder according to claim 1, wherein the ammonium salt is a single salt or a mixture of salts selected from the group of ammonium sulfate, ammonium alums, ammonium lignosulphonate and ammonium hydrogen phosphate.

9. The binder according to claim 1, wherein said binder optionally comprises a protein component, and wherein the ammonium salt is at least 50 wt % relative to all nitrogen-containing components capable to cross-link with hydroxyaldehydes without considering the optionally present protein component.

10. The binder according to claim 9, wherein the weight portion of the sum of all nitrogen-containing components which are capable to cross-link with hydroxyaldehydes, including the ammonium salt and excluding proteins, is at least 15 wt. % of the binder.

11. The binder according to claim 1, which is a two or multi-component binder, the components of which are mixed directly before its use or are applied separately.

12. The binder according to claim 1, wherein said hydroxyaldehyde comprises glyceraldehyde and wherein said binder further comprises dihydroxyacetone.

13. The binder according to claim 1, wherein said binder further comprises a denatured protein.

14. A composite material product obtainable by binding a cellulose-containing starting material with said binder according to claim 1 and shaping to a product.

15. The composite material product according to claim 14, wherein the starting material is wood and/or paper.

16. The composite material product according to claim 14, which is plate-shaped.

17. A process for preparing the binder according to claim 1, wherein said ammonium salt is mixed with said at least difunctional hydroxy compound and said oxidizing agent to form said hydroxyaldehyde in situ.

18. The process according to claim 17, wherein water in an amount of at most 48 wt. %, at least one ammonium salt, glycerol, hydrogen peroxide, a protein component, optionally an additional amine or amide as well as optionally additives and auxiliaries are mixed.

19. A process for binding cellulose-containing materials, said process comprising forming a hydroxyaldehyde with an at least difunctional hydroxy compound and an oxidizing agent comprising hydrogen peroxide and condensing at least a portion of said hydroxyaldehyde with an ammonium salt to form a binder in the presence of at least a portion of said at least difunctional hydroxy compound and at least a portion of said oxidizing agent, wherein said hydrogen peroxide is present in an amount between 1 and 10 weight percent, based on the total weight of the binder and said ammonium salt is present in an amount of at least 15 weight percent, based on the total weight of the binder.

20. The process according to claim 19, wherein the bound cellulose-containing material is shaped to a composite material product.

21. The process according to claim 19, wherein said hydroxyaldehyde comprises glyceraldehyde and wherein said binder further comprises dihydroxyacetone.

22. The process according to claim 19, wherein said binder further comprises a denatured protein.

* * * * *

UNITED STATES PATENT AND TRADEMARK OFFICE
CERTIFICATE OF CORRECTION

PATENT NO. : 11,078,365 B2
APPLICATION NO. : 16/085910
DATED : August 3, 2021
INVENTOR(S) : Edelmann et al.

It is certified that error appears in the above-identified patent and that said Letters Patent is hereby corrected as shown below:

On the Title Page

Please replace the Applicant item (71) and the Assignee item (73) with the following:
"Sestec Sp. z o.o., Kraków (PL)"

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*